(12) United States Patent
Hasegawa et al.

(10) Patent No.: US 10,316,195 B2
(45) Date of Patent: Jun. 11, 2019

(54) ZINC-BASED COMPOSITE MATERIAL AND USE THEREOF

(71) Applicant: RETUG INC., Minokamo-shi, Gifu (JP)

(72) Inventors: Hiroko Hasegawa, Nagoya (JP); Kunihiko Hirose, Nagoya (JP)

(73) Assignee: RETUG INC., Minokamo-shi (JP)

( * ) Notice: Subject to any disclaimer, the term of this patent is extended or adjusted under 35 U.S.C. 154(b) by 0 days.

(21) Appl. No.: 14/773,550

(22) PCT Filed: Mar. 6, 2013

(86) PCT No.: PCT/JP2013/056138
§ 371 (c)(1),
(2) Date: Dec. 9, 2015

(87) PCT Pub. No.: WO2014/136219
PCT Pub. Date: Sep. 12, 2014

(65) Prior Publication Data
US 2016/0115321 A1   Apr. 28, 2016

(51) Int. Cl.
  *C09C 1/62* (2006.01)
  *C09D 5/08* (2006.01)
  *C09K 15/02* (2006.01)
  *C09C 1/64* (2006.01)
  *C09D 201/00* (2006.01)
  (Continued)

(52) U.S. Cl.
  CPC ............ *C09C 1/62* (2013.01); *C09C 1/64* (2013.01); *C09D 5/084* (2013.01); *C09D 7/40* (2018.01); *C09D 7/61* (2018.01); *C09D 201/00* (2013.01); *C09K 15/02* (2013.01); *C08K 9/02* (2013.01);
  (Continued)

(58) Field of Classification Search
  CPC ........... C09C 1/62; C09C 1/64; C09D 201/00; C09D 5/084; C09D 7/12; C09D 7/1216; C09K 15/02
  See application file for complete search history.

(56) References Cited

U.S. PATENT DOCUMENTS

2001/0022149 A1    9/2001  Hirose
2004/0194663 A1   10/2004  Li et al.
(Continued)

FOREIGN PATENT DOCUMENTS

CN    1538995 A    10/2004
JP    S53-144932 A    12/1978
(Continued)

OTHER PUBLICATIONS

Dec. 16, 2016 Office Action issued in Chinese Patent Application No. 201380076307.3.
(Continued)

*Primary Examiner* — Shuangyi Abu Ali
(74) *Attorney, Agent, or Firm* — Oliff PLC

(57) ABSTRACT

To provide a new aluminium/zinc composite material that is a solid and safe and can be used as a substitute for conventional aluminium pastes or flakes in terms of at least appearance properties. The composite material contains aluminium particles and zinc particles held on the surfaces thereof. The inclusion of such composite particles renders the composite material effectively usable as a substitute for aluminium pastes.

15 Claims, 2 Drawing Sheets

(51) Int. Cl.
C09D 7/40 (2018.01)
C09D 7/61 (2018.01)
C08K 9/02 (2006.01)
C08K 3/08 (2006.01)

(52) U.S. Cl.
CPC ............... *C08K 2003/0812* (2013.01); *C08K 2201/003* (2013.01)

(56) References Cited

U.S. PATENT DOCUMENTS

| | | |
|---|---|---|
| 2010/0301485 A1 | 12/2010 | Sekine et al. |
| 2013/0186943 A1 | 7/2013 | Sekine et al. |

FOREIGN PATENT DOCUMENTS

| | | |
|---|---|---|
| JP | S54-86524 A | 7/1979 |
| JP | 2000-017194 A | 1/2000 |
| JP | 2006-348147 A | 12/2006 |
| JP | 2006348147 | * 12/2006 |
| JP | 2011-146193 A | 7/2011 |
| JP | 2012-016740 A | 1/2012 |

OTHER PUBLICATIONS

Oct. 31, 2016 Search Report issued in European Patent Application No. 13877147.2.
Apr. 9, 2013 Search Report issued in International Patent Application No. PCT/JP2013/056138.
Apr. 9, 2013 Written Opinion issued in International Patent Application No. PCT/JP2013/056138.
Apr. 14, 2015 International Preliminary Report on Patentability issued in International Patent Application No. PCT/JP2013/056138.
Oct. 13, 2015 Office Action issued in Japanese Patent Application No. 2015-504052.
Jun. 27, 2017 Office Action issued in Australian Application Patent No. 2013381306.
Jul. 31, 2017 Office Action issued in Chinese Patent Application No. 201380076307.3.
Mar. 15, 2018 Office Action issued in Australian Patent Application No. 2013381306.

* cited by examiner

ZINC-BASED COMPOSITE MATERIAL AND USE THEREOF

TECHNICAL FIELD

The specification of the present application relates to a zinc-based composite material and use thereof.

BACKGROUND ART

As a paint or a printing ink, an aluminium pigment containing aluminium dust produced by an atomizing method as aluminium flakes has been conventionally used widely. The aluminium flakes themselves have a thickness of 0.1 µm or less and an average particle diameter of 1 µm or more and are dangerous because they produce heat by oxidation, generation of hydrogen, and the like, caused by oxygen and moisture in atmosphere. Therefore, aluminium flakes are provided as a paste containing 65% to 67% by mass of aluminium flakes in oils and fats, a mineral oil, a dispersant, a gas absorbent, and the like.

However, for various applications, providing the aluminium flakes not as a paste but as a solid aluminium-based material such as a powder that is easy to be handled and is safe is more convenient. Therefore, producing aluminium-containing zinc flakes using zinc has been attempted (Patent Literature 1).

CITATION LIST

Patent Literature

Patent Literature 1: Japanese Patent Application Publication No. 2006-348147

SUMMARY OF INVENTION

Aluminium-containing zinc flakes described in Patent Literature 1 are useful as a solid aluminium-based material that is solid and safe. However, the appearance comparable to an aluminium paste cannot be obtained, and in the formation of a coating using aluminium-containing zinc flakes, it is required to mix another aluminium paste in order to maintain the appearance.

Moreover, a composite material of zinc and aluminium, having rust preventive ability, is also useful in forming a coating having a rust and corrosion preventive function. However, a treatment at high temperature is generally required to form a rust preventive coating. Therefore, an inorganic coating forming agent that can cause a coating to be formed at low temperature is required in light of energy saving.

The specification of the present application provides a zinc-based composite material that is solid and safe and can be used as a high-quality substitute for conventional aluminium flakes in terms of at least appearance properties and use thereof. The specification of the present application further provides a zinc-based composite material that can be used in formation of a rust preventive coating and the like and use thereof.

Solution to Technical Problem

The inventors of the present invention newly obtained a composite material containing aluminium particles and/or tin particles and zinc held on the surfaces thereof. They obtained the finding that the composite material containing aluminium particles and zinc that adheres to the surfaces thereof can be a substitute for aluminium pastes used as a conventional pigment and the like in light of the appearance. They also obtained the finding that this aluminium/zinc composite material can exert superior properties compared with using conventional aluminium pastes.

They also obtained the finding that the composite material containing tin particles and zinc that adheres to the surfaces thereof is superior in coat-forming ability and is effective as a binder at the time of forming a rust preventive coat. The following means are provided based on these findings.

(1) A composite material comprising: composite particles containing aluminium particles and/or tin particles, and zinc particles, with the composite particles dominantly holding on surface sides thereof the zinc particles.

(2) The composite material according to the above-described item (1), wherein the composite particles contain tin particles and zinc particles.

(3) The composite material according to the above-described item (1) or (2), comprising: first composite particles containing aluminium particles and zinc particles, with the first composite particles dominantly holding on surface sides thereof the zinc particles; and
second composite particles containing tin particles and zinc particles, with the second composite particles dominantly holding on surface sides thereof zinc particles.

(4) The composite material according to any one of the above-described items (1) to (3), comprising the composite particles with an average particle diameter of about 8 µm or more to about 40 µm or less as a whole.

(5) The composite material according to any one of the above-described items (1) to (4), which is obtained by wet-mixing a zinc-based powder with a first average particle size and an aluminium-based powder or a tin powder with a second average particle diameter, which is larger than the first average particle size, using a mill to form the zinc-based powder and the aluminium-based powder or the tin powder into flakes and form a composite.

(6) A method for producing the composite material according to any one of the above-described items (1) to (5), comprising a step of: wet-mixing a zinc-based powder with a first average particle diameter and an aluminium-based powder or a tin powder with a second average particle diameter, which is larger than the first average particle diameter, with a mill using balls or beads to form the zinc-based powder and the aluminium-based powder or the tin powder into flakes and form a composite.

(7) The method according to the above-described item (6), wherein the zinc-based powder is a powder obtained by an evaporation method, and the aluminium-based powder or the tin powder is a powder obtained by an evaporation method or an atomizing method.

(8) A metal surface treatment agent comprising the composite material according to any one of the above-described items (1) to (5).

(9) The metal surface treatment agent according to the above-described item (8), comprising the composite material according to the above-described item (3).

(10) A rust and corrosion preventive agent comprising the composite material according to any one of the above-described items (1) to (5).

(11) The rust and corrosion preventive agent according to the above-described item (10), comprising the composite material according to the above-described item (3).

(12) A pigment comprising the composite material according to any one of the above-described items (1) to (5).
(13) The pigment according to the above-described item (12), comprising the composite material according to the above-described item (3).
(14) A paint comprising the composite material according to any one of the above-described items (1) to (5).
(15) The paint according to the above-described item (14), comprising the composite material according to the above-described item (3).
(16) A method for producing a metal surface-treated body, comprising a step of supplying the metal surface treatment agent according to the above-described item (8) or (9) onto the surface of a body to be surface-treated with a metal, to form a coat.
(17) A method for producing a rust and corrosion prevention-treated body, comprising a step of supplying the rust and corrosion preventive agent according to the above-described item (10) or (11) onto the surface of an object to be a rust and corrosion prevention-treated, to form a coat.
(18) A method for producing a coated body, comprising a step of supplying the paint according to the above-described item (13) or (14) onto a surface of an object to be coated.
(20) A coat holding body, comprising a coat that contains the composite material according to any one of the above-described items (1) to (5).

DESCRIPTION OF EMBODIMENTS

The disclosure of the specification of the present application relates to a zinc-based composite material having a specific composite form and use thereof. The composite material disclosed in the specification of the present application is a composite of aluminium particles and/or tin particles and zinc particles, and zinc particles may be dominantly provided on the surface sides of these composite particles.

The composite material disclosed in the specification of the present application at least includes a form of an aluminium/zinc composite material containing composite particles that contain aluminium particles and zinc particles, a form of a tin/zinc composite material containing composite particles that contain tin particles and zinc particles, and a form of aluminium/tin/zinc composite material containing composite particles that contain aluminium particles and zinc particles and composite particles that contain tin particles and zinc particles.

(Aluminium/Zinc Composite Material)

Figure 1:
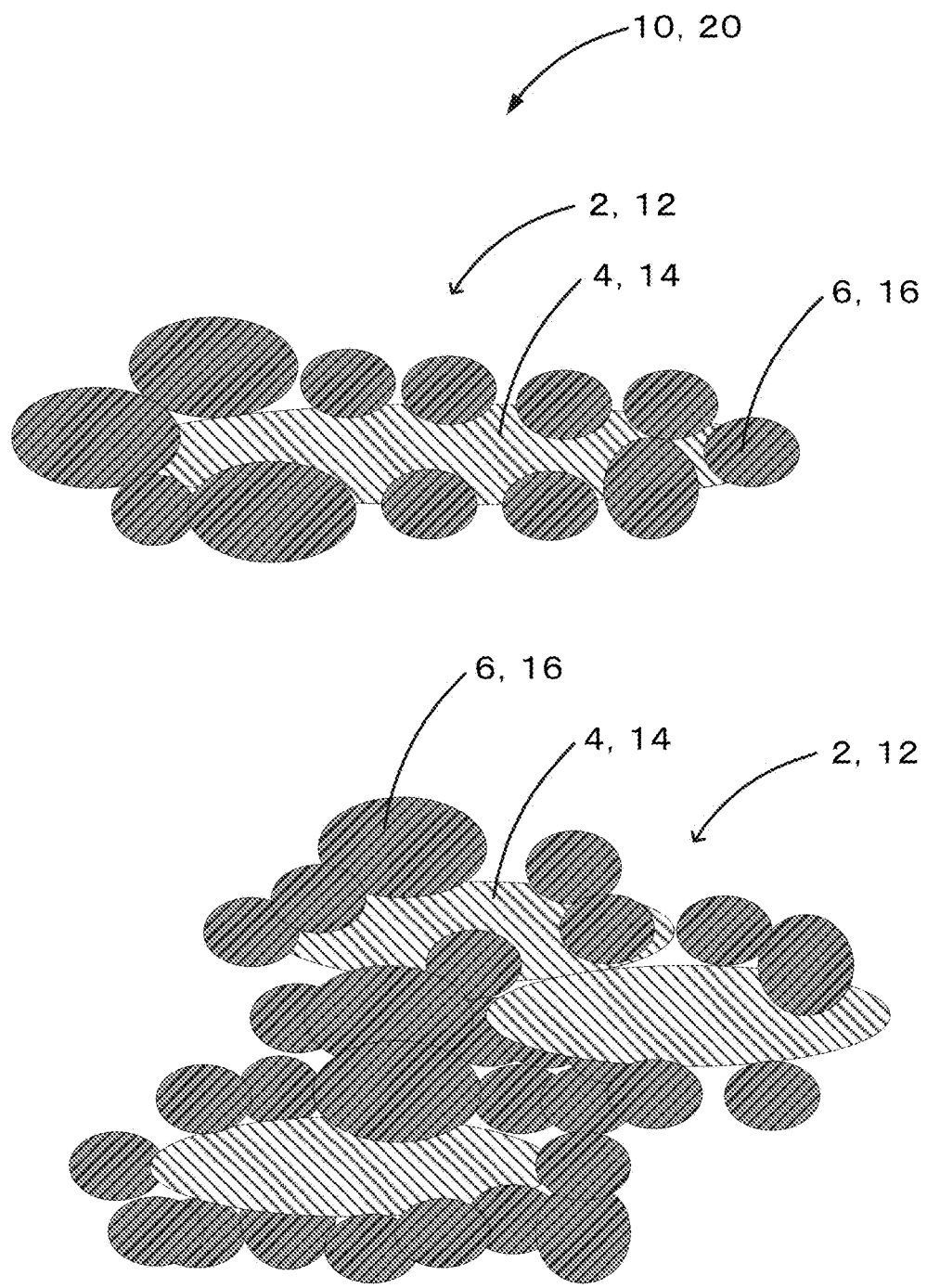
FIG. 1 is a drawing showing an example of a composite form in a composite material disclosed in the specification of the present application as a cross-sectional structure.

In the aluminium/zinc composite material, dominantly including zinc particles on the surface sides means that zinc particles are dominantly present on the surface sides of the aluminium particles to the extent that zinc can suppress the reactivity of aluminium. As shown in FIG. 1, the aluminium/zinc composite material can be, for example, in a form in which zinc particles that are smaller than aluminium particles are held on the aluminium particles that are cores so as to form shells or a form in which a plurality of such composite particles are aggregated. The zinc particles may be further present inside the composite particles. According to the aluminium/zinc composite material, the instability of aluminium to oxygen and moisture is suppressed by forming a composite in which zinc particles are dominantly held on the surfaces of the composite particles. Therefore, even when the composite material is a solid as an aluminium-based material, the composite material can be safely stored and handled against spontaneous combustion, moisture, water, and the like.

The aluminium/zinc composite material can have superior appearance properties such as having the same high brightness as an aluminium paste while maintaining rust and corrosion preventive function based on zinc. Moreover, the composite material of the present application can maintain the appearance flexibility by adjusting the content and the size of the aluminium-based material. Thus, a favorable silver-gray coat based on aluminium can be formed by only the aluminium/zinc composite material as a pigment.

Moreover, when the aluminium particles are flakes, the composite particles themselves can be flat flakes in the composite material of the present application. Therefore, when a coat such as a coating is formed, the composite particles are prone to be removed gradually from the surface of the film. According to such removable form, the aluminium/zinc composite material inside the film is exposed one after another, and thus, the coat properties can be successively exerted.

(Tin/Zinc Composite Material)

In the tin/zinc composite material, dominantly including zinc particles on the surface sides means that zinc particles are dominantly present on the surface sides of the tin particles to the extent that zinc can suppress the reactivity of tin. As shown in FIG. 1, the tin/zinc composite material can be, for example, in a form in which zinc particles that are smaller than tin particles are held on the tin particles that are cores so as to form shells or a form in which a plurality of such composite particles are aggregated. The zinc particles may be further present inside the composite particles. For example, tin particles are maintained without being oxidized or hydroxylated, and thus, tin is dissolved around the original melting temperature and adheres to surrounding materials and can exert an excellent binder function. Moreover, when tin is melted, zinc that is in contact with the tin is also melted. Therefore, in the tin/zinc composite material, zinc can also function as a binder. Thus, the tin/zinc composite material has a rust and corrosion preventive function based on zinc and also has a superior binder ability and a superior coat forming ability caused by the tin particles. Therefore, the tin/zinc composite material can be used in a rust and corrosion preventive material and can also be used as a binder at the same time. Specifically, the tin/zinc composite material can form a coat having favorable adhesiveness even at low temperature and can also cause plastic forming and the like to be performed easily.

Although it does not bind the disclosure of the specification of the present application, zinc is held (zinc particles that are smaller than aluminium particles and the like are held) on the surfaces of aluminium particles or tin particles in each composite material disclosed in the specification of the present application, and thus, the composite material exerts both of properties of the aluminium particles or the tin particles and properties of the zinc. It is specifically considered that the aluminium/zinc composite material is superior in appearance properties, and the appearance properties are easily adjusted. Moreover, the tin/zinc composite material is prone to exert properties as a tin material, and thus, plastic forming and softening at low temperature are performed easily.

(Aluminium/Tin/Zinc Composite Material)

The aluminium/tin/zinc composite material contains both of the composite particles of the above-described aluminium-zinc composite material and the composite particles of the above-described tin/zinc composite material and can be obtained by mixing these composite materials as appropriate.

Each composite material and use thereof are described in detail below with reference to various aspects. In the specification of the present application, the numerical value indicated with "about" is a numerical value obtained by rounding off a digit (n+1) that is one digit smaller than the significant digits of a numerical value corresponding to the numerical value shown in the specification of the measured value (the significant digits in the specification of the present application means the number of decimal places).

(Composite Materials and Production Methods Thereof)
(Aluminium/Zinc Composite Material)

An aluminium/zinc composite material 10 contains composite particles 2 that contain aluminium particles 4 and zinc 6 held on the surfaces of the aluminium particles 4. The aluminium/zinc composite material 10 is preferably based on such composite particles. For example, as shown in FIG. 1, the composite particles 2 can have a structure in which zinc particles 6 are held on the surfaces of the aluminium particles 4 to coat the whole or a part of the surfaces of the aluminium particles 4 with the zinc particles 6 or can be composed of such structures linked or aggregated.

(Aluminium Particles)

The particle form of the aluminium particles 4 in the composite particles 2 is not limited to particular forms. The form can be, for example, a spherical shape, a drop shape, an indefinite shape, a needle shape, a thin piece (flake) shape, or the like and may be a mixture of two or more of them. The aluminium particles with a spherical shape, a drop shape, or an indefinite shape or a mixture powder thereof is produced by an atomizing method in many cases. From the viewpoint of a substitute for conventionally used aluminium flakes, the flake shape can be used. When the flake shape is mentioned in the specification of the present application, it means a thin piece shape of any of various flat form. Aluminium particles with a flake shape can be obtained by forming particles produced by an atomizing method or the like into flakes.

The aluminium particles 4 are based on aluminium and preferably contain 98% or more of aluminium. As impurities, the content of copper is preferably 0.015% or less, the content of iron is preferably 0.2% or less, the content of silicon is preferably 02% or less, and the content of water is preferably 0.1% or more.

(Zinc Particles)

The zinc particles 6 in the composite particles 2 are based on zinc, and the content of zinc is preferably 97% or more. As impurities, the content of lead is preferably 0.1% or less, the content of cadmium is preferably 0.05% or less, and the content of iron is preferably 0.02% or less.

When the particle form of the zinc particles 6 in the composite particles 2 can be checked, the particle form can be a spherical shape, a needle shape, an indefinite shape, a flake shape, or the like. The zinc particles 6 are present on the surfaces of the aluminium particles 4 or between the aluminium particles 4 and may at least partially be a coat on the surface sides of the composite particles 2 by linking a plurality of the zinc particles 6. Whether or not the zinc particles 6 cover the surfaces of the aluminium particles 4 by successively linking the zinc particles 6 so as to form a coat or are present among the aluminium particles 4 depends on the ratio of aluminium and zinc to be mixed. The zinc particles 6 may not maintain the particle shape and may be a coat by covering most of the surfaces of the aluminium particles 4 according to the ratio of them to be mixed. The form of the zinc particles 6 in the aluminium/zinc composite material disclosed in the specification of the present application includes all of the forms described herein.

When the form of each of the zinc particles 6 in the composite particles 2 can be checked, the form of each of the zinc particles is preferably a flake shape. This is because the zinc particles can be held as a coat on the surfaces of the aluminium particles 4 when the form is a flake shape. When the form of the zinc particles 6 can be checked, all of the composite particles 2 are prone to be formed into flakes, and in the coat including the composite material 10 of the present application, described below, the composite material 10 itself is prone to be removed as a thin piece. Moreover, the appearance properties are easily adjusted, and high brightness can be exerted. Furthermore, the safety of handling can be easily maintained.

The mixing of the aluminium particles 4 and the zinc particles 6 in the composite material 10 is not limited to particular mixing, and the amount of the aluminium particles 4 is preferably about 1% by mass or more to about 40% by mass or less relative to the total mass of the aluminium particles 4 and the zinc particles 6. When the amount is less than 1% by mass, the amount of the aluminium particles 4 is too small, and a function as a substitute for the function of the aluminium paste cannot be exerted. When the amount exceeds 40% by mass, the ratio of zinc is too small, and an effect of alleviating the reactivity of aluminium by zinc is too weak. The amount of the aluminium particles 4 is more preferably about 5% by mass or more to about 30% by mass or less, yet more preferably about 10% by mass or more to about 30% by mass or less. With increasing the ratio of the aluminium particles 4 to the zinc particles 6, the color of zinc (silver gray) becomes intense.

The thickness of the composite particles 2 is preferably about 1 μm or less, more preferably 0.5 μm or less, yet more preferably about 0.1 μm or less. Moreover, the composite particles 2 are preferably flakes with an average particle diameter of about 8 μm or more to about 40 μm or less. When the composite particles 2 has a flake shape with such average particle diameter, the composite material 10 itself is prone to be easily removed as a thin piece at the time of forming a coat as mentioned above. Moreover, the appearance properties can be easily adjusted, and high brightness can be exerted. Furthermore, the safety of handling is easily maintained. The average particle diameter is more preferably about 10 μm or more to about 30 μm or less, yet more preferably about 10 μm or more to about 20 μm or less.

The thickness of the composite particles 2 was measured as a flake thickness by forming a coating with a thickness of about 15 μm on one surface of an appropriate test piece, fixing the surface of the coating with an epoxy resin then cutting the piece, and thereafter displaying the cross section thereof with an electron microscope with 1/100 mm as 10 μm. The thickness may be measured by another method by which the same precision and accuracy as those obtained by the above-described method and conditions are obtained. The average particle diameter of the composite particles 2 may be measured by employing a laser diffraction-light scattering method. The average particle diameter may be measured by another method by which the same precision and accuracy as those obtained by the above-described method and conditions are obtained. As a particle size distribution measurement device by the laser diffraction-light scattering method, SALD series (for example, SALD-2000J) produced by Shimadzu Corporation can be used.

(Tin/Zinc Composite Material)

The tin/zinc composite material 20 contains composite particles 12 that contains tin particles 14 and zinc 16 held on the surfaces of the tin particles 14. The tin/zinc composite material 20 is preferably based on the composite particles 12. For example, as shown in FIG. 1, the composite particles 12 can have a structure in which zinc particles 16 are held on the surfaces of the tin particles 14 to coat the surfaces of the tin particles 14 with the zinc particles 16 or can be composed of such structures linked or aggregated.

(Tin Particles)

The particle form of the tin particles 14 in the composite particles 12 is not limited to particular forms. The form can be, for example, a spherical shape, an indefinite shape, a needle shape, a drop shape, a thin piece (flake) shape, a mixture of two or more of them, or the like.

The tin particles 14 are based on tin and preferably contain 98% or more of tin. More specifically, the tin is βtin, and the purity thereof is 99.0% or more, preferably 99.5% or more, more preferably 99.7% or more.

(Zinc Particles)

As the zinc particles 16 in the composite particles 12, a configuration of the same form as the zinc particles 6 in the composite particles 2 of the aluminium/zinc composite material 10 can be employed. When the particle form of the zinc particles 16 in the composite particles 12 can be checked, the particle form can be a spherical shape, a needle shape, an indefinite shape, a flake shape, or the like. The zinc particles 16 are present on the surfaces of the tin particles 14 or between the tin particles 14 and may at least partially be a coat on the surface sides of the composite particles 12 by linking a plurality of the zinc particles 16. Whether or not the zinc particles 16 cover the surfaces of the tin particles 14 by successively linking the zinc particles 16 so as to form a coat or are present among the tin particles 14 depends on the ratio of aluminium and zinc to be mixed. The zinc particles 16 may not maintain the particle shape and may be a coat by covering most of the surfaces of the tin particles 14 according to the ratio of them to be mixed. The form of the zinc particles 16 in the aluminium/zinc composite material disclosed in the specification of the present application includes all of the forms described herein.

When the form of each of the zinc particles 16 in the composite particles 12 can be checked, the form of each of the zinc particles is preferably a flake shape. This is because the zinc particles can be held more easily as a coat on the surfaces of the tin particles 14 when the form is a flake shape. When the form of the zinc particles 16 can be checked, all of the composite particles 12 are prone to be formed into flakes, and in the coat including the composite material 10 of the present application, described below, the composite material 20 itself is prone to be removed as a thin piece. Moreover, the appearance properties are easily adjusted, and high brightness can be exerted. Furthermore, the safety of handling can be easily maintained.

The mixing of the tin particles 14 and the zinc particles 16 in the composite material 20 is not limited to a particular ratio, and the amount of the tin particles 14 is preferably about 1% by mass or more to about 40% by mass or less relative to the total mass of the tin particles 14 and the zinc particles 16. When the amount is less than 1% by mass, the amount of the tin particles 14 is too small, and the binding function is small. When the amount exceeds 40% by mass, the ratio of zinc is too small, and an effect of alleviating the reactivity of tin by tin and the rust preventive function is too weak. The amount of the tin particles 14 is preferably about 5% by mass or more to about 30% by mass or less. With increasing the ratio of the tin particles 14 to the zinc particles 16, the color of tin (yellowish silver gray) becomes intense.

The thickness of the composite particles 12 is preferably about 1 μm or less, more preferably 0.5 μm or less, yet more preferably about 0.1 μm or less. The composite particles 12 are preferably flakes with an average particle diameter of about 8 μm or more to about 40 μm or less. When the composite particles 2 has a flake shape with such average particle diameter, the composite material 20 itself is prone to be easily removed as a thin piece at the time of forming a coat as mentioned above. The average particle diameter is more preferably about 10 μm or more to 30 μm or less. The average particle diameter is yet more preferably about 10 μm or more to about 20 μm or less. The average particle diameter of the composite particles 12 can be measured by the same method as the composite particles 2 of the composite material 10.

(Production Method)

Figure 2:
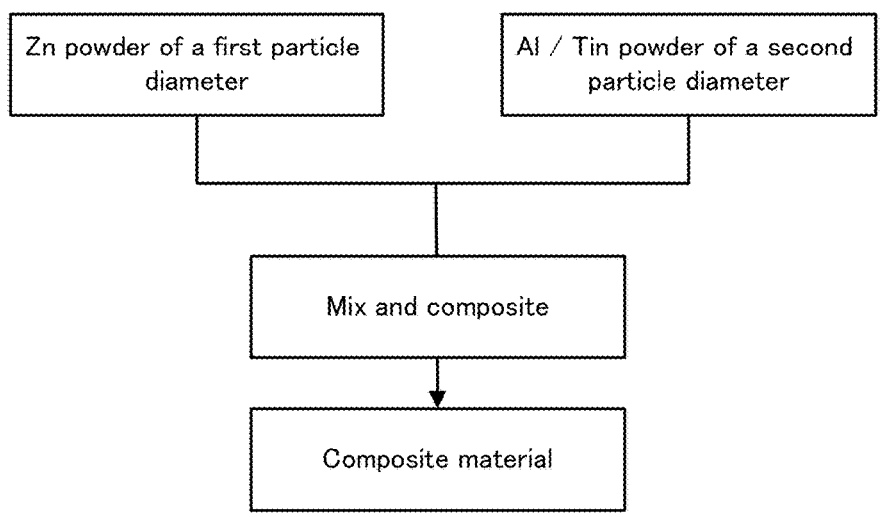
FIG. 2 is a drawing showing an example of a method for producing a composite material disclosed in the specification of the present application.

The composite material 10 containing such composite particles 2 and the composite material 20 containing such composite particles 12 may be obtained by the production method shown below, for example. As shown in FIG. 2, the production method includes the step of wet-mixing a zinc powder with a first average particle diameter and an aluminium powder or a tin powder with a second average particle diameter that is larger than the first average particle diameter with a mill to form a composite of the zinc-based powder and the aluminium powder or the tin powder. According to this production method, a composite of the zinc-based powder and the aluminium-based powder or the tin powder may be formed by using powder materials as starting materials of both of the zinc-based powder and the aluminium-based powder or the tin powder and wet-mixing these materials in a liquid medium while or without forming the materials into flakes. Thus, the composite materials 10 and 20 having favorable properties can be obtained.

The composite particles 2 and 12 having a specific form disclosed in the specification of the present application can be obtained by causing the average particle diameter (second average particle diameter) of the aluminium powder or the tin powder to be larger than the average particle diameter (first average particle diameter) of the zinc powder. When the second average particle diameter is the same as the first average particle diameter or less, particles in the state where smaller aluminium particles and the smaller tin particles are buried in the surfaces of the zinc particles (typically, a composite form obtained by the method described in Patent Literature 1) is prone to be generated. The composite particles with such form are less prone to exert properties of aluminium and tin.

The zinc powder has the composition described for the zinc particles of the composite materials 10 and 20, and the average particle diameter (first average particle diameter) of the zinc powder is smaller than the average particle diameter (second average particle diameter) of the aluminium powder or the tin powder and is preferably about 2 μm or more to about 10 μm or less. Furthermore, the maximum particle diameter of the zinc powder is preferably about 40 μm or less. With such average particle diameter, crushing and mixing by a mill can be performed efficiently. The first average particle diameter is more preferably about 5 μm or less. Moreover, the maximum particle diameter of the zinc powder is more preferably about 15 μm or less. As the zinc-based powder, a zinc-based powder obtained by an atomizing method, an evaporation method, or the like can be used, and a zinc-based powder obtained by an evaporation method is preferable.

The average particle diameter of the aluminium powder or tin powder is preferably about 8 μm or more to about 40 μm or less. With such average particle diameter of the aluminium powder or the tin powder, the composite particles 2 and 12 can be formed into composites with about such average particle diameter. The average particle diameter is more preferably about 10 μm or more to about 30 μm or less. The average particle diameter of the aluminium powder or the tin powder can be measured by preferably a laser diffraction-light scattering method described above.

Each of the aluminium powder and the tin powder has the composition described for the aluminium particles or the tin particles and is preferably subjected to a mixing step in the state of not an aluminium paste but a powder form. When the aluminium powder has a powder form, and the second average particle diameter is larger than the first average particle diameter, the forms of the composite particles 2 and 12 in the composite material disclosed in the specification of the present application can be achieved.

(Mill)

It is preferred that a bead mill or a ball mill is used as the mill. The mill is preferably a bead mill. The kind of the bead mill is not limited to particular kinds. As the bead mill, for example, a completely-sealed horizontal micro-bead mill can be used. In the horizontal mill, the dispersion media are hardly affected by gravity and thus can be dispersed, and thus, the almost ideal uniform dispersion can be obtained in a cylinder. Moreover, the horizontal mill can be filled with dispersion media at a high density of 80% to 85%.

As the dispersion media used in the bead mill, glass beads, zircon beads, zirconia beads, steel balls, or the like can be used according to the viscosity, the specific gravity, and the water content of an object to be treated and the particle size in dispersion. When the zinc-based powder and the aluminium-based powder are mixed, zircon beads or zirconia beads are preferably used. As to the size of each of the dispersion media, dispersion media each with a spherical diameter of about 0.1 mm φ or more to about 3.0 mm φ or less can be used according to the desired size of each of the flakes, and dispersion media each with a spherical diameter of about 0.1 mm φ or more to about 1.5 mm φ or less are generally used. Specifically when the zinc-based powder and the aluminium-based powder are mixed, dispersion media each with a spherical diameter of about 0.5 mm φ or more to about 1.0 mm φ or less are used.

When the zinc-based powder and the aluminium-based powder are wet-mixed with a mill, they are mixed together with a liquid medium and a lubricating agent.

(Liquid Medium)

The liquid medium to be used in the mixing step is preferably based on an organic solvent. The liquid medium is more preferably composed of an organic solvent. The boiling point of the organic solvent is preferably about 100° C. or more, more preferably about 150° C. or more to about 250° C. or less. This is because catching fire can be prevented, and the organic solvent can be distilled under reduced pressure to recover and recycle by using the organic solvent with a boiling point that is the boiling point or more of water and 259° C. or less. The organic solvent is not limited to particular solvents, and examples thereof include petroleum benzine, heating oil, light oil, kerosene, mineral spirit, and mineral turpentine. The amount of the organic solvent is preferably 1.2 times or more to 5 times or less relative to the total amount of the zinc-based powder and the aluminium-based powder to be used although it depends on the mill to be used. The amount is more preferably 2 times or more to 5 times or less, yet more preferably 3 times or more to 5 times or less.

(Lubricating Agent)

In the mixing step, a different lubricating agent ("lubricant") is used according to the purpose of use of the obtained composite material 10. The lubricating agent is preferably a lubricating agent that can form the raw powder into flakes and can accelerate and maintain forming a composite without inhibiting it, and can hold and disperse the composite particles 2. The lubricating agent has a lubricating ability and durability. The lubricating agent preferably further has coatability of coating the surfaces of powder particles and flakes in order to prevent oxidation and the like and scattering ability of being scattered from the surfaces of raw particles and composite particles at a predetermined temperature or more.

Examples of the lubricating agent include higher fatty acid, higher fatty acid ester, higher aliphatic alcohol, and alkyl ether of higher aliphatic alcohol. The amount of the lubricating agent to be used is not limited to particular amounts and is preferably about 0.1% by mass or more to about 30% by mass or less relative to the total mass of raw powder to be treated. The amount is more preferably about 0.5% by mass or more to about 10% by mass or less.

Moreover, in the mixing step, an antioxidant and the like may be added as appropriate.

In the mixing step, raw materials including a raw powder, a liquid medium, and a lubricating agent are mixed in a mill. The conditions in the mixing step such as, for example, the flow rate of liquid, the peripheral speed of blades in a cylinder, the mixing temperature, and the mixing time are set as appropriate considering the form and the average particle diameter of the composite particles 2 to be obtained. Typically, when 1 kg of raw powder is formed into a composite, the flow rate of liquid is about several litters to about 20 L/min, the peripheral speed of blades is about several tens of meters to about 200 m/min, the liquid temperature is about 10° C. or more to about 20° C. or less, and the mixing time is about 4 hours or more to about 10 hours or less. As mentioned above, as to the size of the composite particles 2 obtained eventually, the composite particles 2 are flakes with a thickness of about 0.1 μm or less and an average particle diameter of about 8 μm or more to about 40 μm or less.

By the production step, the composite particles 2 and 12 can be obtained in each mixture. Thereafter, the organic solvent, the lubricating agent, and the like in this mixture are removed by evaporation or filtration and washing if necessary. Thus, the composite materials 10 and 20 each containing the composite particles 2 can be obtained. The composite materials 10 and 20 may further be sieved by any of various methods in the state of powder or in the presence of the organic solvent so as to have a desired average particle diameter. The aluminium/tin/zinc composite material can be obtained by mixing the aluminium/zinc composite material and the tin/zinc composite material obtained as described above.

The surfaces of the composite particles 2 and 12 may be coated with a resin or specially treated with a coupling agent or the like according to the purpose of use. Thus, the composite materials 10 and 20 are obtained according to a specific intention. In this case, the lubricating agent and the like are washed and removed from the obtained composite materials 10 and 20 with an organic solvent, mineral spirit, or the like that is compatible thereto, and thereafter, the additional treatment is performed.

In the case of resin coating treatment, the composite material 10 after washing is further dispersed in an appropriate organic solvent, a polymerizable monomer or an oligomer and a polymerization initiator are added little by little, the monomer and the like are polymerized while stirring, to coat the composite particles 2 and 12. The amount of the polymerizable monomer to be used is preferably about 0.5% to about 20% by mass, more preferably about 1% to about 5% by mass relative to the composite materials 10 and 20. The organic solvent is then removed, and the composite material 10 is dried. Thus, the composite material 10 coated with a resin is obtained. The polymerizable monomer and the like to be used and the resultant resin are not particularly limited, and the resin satisfying functions as a surface treatment agent and a rust and corrosion preventive agent described below is widely known to a person skilled in the art, and those skilled in the art can select and employ the polymerizable monomer and the like for resin coating and the polymerizing conditions as appropriate.

In the case of treating with a coupling agent, for example, the lubricating agent is washed and removed with an alcohol-based organic solvent such as propyl alcohol, butyl alcohol, or butyl cellosolve, and the composite material 10 is dispersed in the alcohol-based organic solvent. Thereafter, an alkoxy group of the coupling agent is caused to change to a hydroxyl group, and the coupling agent is then dissolved in the alcohol. The coupling agent is then added to the solution at 60° C. to 80° C. while stirring, the resultant solution is stirred for 1 to 2 hours to cause the coupling agent to react with the surface of the composite material 10 or 20, the alcohol was removed, and the composite material 10 or 20 is dried to obtain a flake powder. The amount of the coupling agent to be used is preferably about 0.5% by weight to about 10% by weight, more preferably about 1% by weight to about 5% by weight relative to the composite material 10 or 20.

Each of the composite materials 10 and 20 obtained as described above itself is used as a pigment or a filler having high brightness and can be used as a raw material of a coat of a surface treatment agent or a rust and corrosion preventive agent or a coat forming agent as mentioned below. Specifically, each of the composite materials 10 and 20 is useful in a field of printing ink and a paint. Examples of the application preferably include tools, chemical devices, plastic products, appliances, wood products, fiber products, and the like in addition to various mobiles such as boats and ships, vehicles, and aircraft and parts thereof.

(Surface Treatment Agent and Method)
(Surface Treatment Agent)

The surface treatment agent contains the composite material 10 and/or the composite material 20. The surface treatment agent contains the composite material 10 and/or the composite material 20 and can further contain a known material as a metal-based surface treatment agent. The surface treatment agent preferably contains the composite material 10 and the composite material 20.

For example, the surface treatment agent is typically for corrosion resistance, heat resistance, and chemical resistance or two or more of them although it depends on the purpose. Such surface treatment agent can contain one or both of the silicon-containing resin and the fluorine-containing resin. The silicon-containing resin and the fluorine-containing resin can function as a binder in the surface treatment agent. The surface treatment agent can be prepared by mixing these materials by a known method.

The surface treatment agent can contain an adhesive. Examples of the adhesive include tin-containing metal powders in various forms. As the tin-containing metal powder, any of powders in various forms, produced by an atomizing method or an evaporation method can be used. As an example, a tin powder formed into flakes can be used. As mentioned below, the composite material 20 can function as the adhesive. When the tin-containing metal powder or the composite material 20 is used as the adhesive, the surface treatment agent contains preferably 1% by mass or more to 50% by mass or less, more preferably 2% by mass or more to 45% by mass or less of it.

(Silicon-containing Resin)

The silicon-containing resin is not limited to particular resins, and examples thereof include: a known silicon resin containing a silicon oil, a silicon grease, or silicon varnish; and a blend of the known silicon resin and a known synthesized resin such as an alkyde resin, an epoxy resin, a polyester resin, or an urethane resin. Examples of the silicon-containing resin further include: a copolymer (modified silicon resin) of these known resins in various forms; A reactant of a synthesized resin having a functional group such as a hydroxyl group, a carboxyl group, an epoxy group, an isocyanate group, or a methylol group and a silane coupling agent having a functional group such as γ-(2-aminoethyl)aminopropyltrimethoxysilane or γ-glycidoxypropyltrimethoxysilane; a homopolymer of a silan coupling agent having a polymerizable vinyl group such as γ-methacryloxypropyltrimethoxysilane, N-β-(N-vinylbenzylaminoethyl)-γ-aminopropylmethoxyilane hydrochloride or vinyltriacetoxysilane; a copolymer the silane coupling agent and one or more kinds of copolymerizable vinyl monomers such as acrylic acid ester, methacrylic acid ester, styrene, acrylonitrile, and vinyl acetate.

(Fluorine-containing Resin)

As the fluorine-containing resin, a known fluorine-containing resin may be used. The fluorine-containing resin is not limited to particular resins, and examples thereof include a homopolymer such as tetrafluoroethylene, vinylidene tetrafluoride, tetrafluorine-containing acrylester, or fluorine-containing methacrylester, a copolymer of these monomers; and a copolymer of one of more kinds of fluorine-containing vinyl monomer of these and one or more kinds of other vinyl monomers that can be copolymerized such as acrylic acid ester, methacrylic acid ester, styrene, acrylonitrile, and vinyl acetate.

The surface treatment agent may contain a solvent. The solvent can be toluole, xylole, methylethylketone, methylisobutylketone, cyclohexanone, ethylacetate, n-butyl acetate, cellosolve acetate, methylcellosolve, ethylcellosolve, n-butylcellosolve, ethanol, isopropanol, n-butanol, diacetone alcohol, cyclohexanol, n-hexane, n-octane, or mineral spirit. The solvent can be preferably diacetone alcohol or xylole.

The surface treatment agent contains about 20 parts by mass or more to about 60 parts by mass or less of the silicon-containing resin and/or fluorine-containing resin and about 5 parts by mass or more to about 35 parts by mass or less of the composite material 10, relative to 20 parts by mass or more to about 40 parts by mass of the solvent. To the surface treatment agent, known materials such as a curing agent for the silicon-containing resin or fluorine-containing resin, a filler, a lubricant, and a surfactant are added if necessary.

The curing agent is selected according to the functional group contained in the silicon-containing resin or fluorine-containing resin. For example, when the functional group has active hydrogen such as a carboxyl group, a hydroxyl group, or an amino group, the curing agent can be dicyanate such as para-phenylene diisocyanate, 2,6-toluenediisocyanate, hexamethylenediisocyanate, 4,4'-diphenyldiisocyanate, 4,4'-diphenyl meta-diisocyanate, or m-phenylenediisocyanate; an adduct of polyhydric alcohol of diisocyanate; or the like.

When the functional group is an epoxy group, the curing agent can be an amino group-containing compound such as diethylenetriamine, triethylenetetramine, tetraethylenepentamine, diethylaminopropylamine, meta-phenylenediamine diphenylmethane, diaminodiphenyl sulfonic acid, dicyandiamide, fluoroborate monoethylamine, a polyamide resin, or heterocyclic diamine; an acidic substance such as phthalic anhydride, hexahydrophthalic anhydride, methylnadic anhydride, or pyromellitic anhydride; or an acidic substance such as lead chromate or zinc chromate The surface treatment agent contains about 10% by mass or less, preferably about 5% by mass or less of the curing agent relative to the total amount of the silicon-containing resin and the fluorine-containing resin.

The filler is not limited to particular fillers and can be a filler used in a known metal surface treatment agent. Examples thereof include metal oxide such as titanium oxide, cobalt oxide, iron oxide, manganese oxide, copper oxide, nickel oxide, tin oxide, vanadium oxide, tungsten oxide, or zinc oxide, metal sulfide such as lead sulfide, nickel sulfide, molybdenum sulfide, iron sulfide, or copper sulfide, and a pigment such as carbon black or calcium carbonate. In the surface treatment agent, the composite material 10 functions as the filler. By mixing an inorganic pigment that functions as the filler to be contained, the composite material can be colored with a color different from the color of aluminium. The inorganic pigment can be, for example, a single component such as a metal, metal oxide, or metal sulfide or a mixture thereof. The surface treatment agent contains about 0.1% by mass or more to about 10% by mass or less, preferably about 0.1% by mass or more to about 8% by mass or less of the curing agent.

The lubricant is not limited to particular lubricants and can be a lubricant used in the known metal surface treatment agent. The lubricant can be, for example, a powdery lubricant such as graphite or molybdenum disulfide. When the surface treatment agent contains powdery fluorine-containing resin, the fluorine-containing resin itself can function as the lubricant. The surface treatment agent contains about 5% by mass or more to about 40% by mass or less, preferably about 10% by mass or more to about 25% by mass or less of the lubricant.

The surfactant is not limited to particular surfactants and can be a surfactant used in the known metal surface treatment agent. Examples of the surfactant include a fatty acid metal salt such as calcium stearate, aluminium stearate, or magnesium stearate; a lignin sulfonic acid metal salt such as calcium lignin sulfonate or aluminium lignin sulfonate; and hydrogenated castor oil. The surface treatment agent contains about 0.1% by mass or more to about 10% by mass or less, preferably about 0.1% by mass or more to about 8% by mass or less of the surfactant.

The surface treatment agent may not necessarily contain a solvent. This is because a solvent is not always necessary when the surface treatment agent is supplied to an object to be surface-treated by a technique of powder coating.

(Surface Treatment Method)

The surface treatment method includes the step of supplying a surface treatment agent on the surface of an object to be surface-treated to form a film. The surface treatment method is also a method for producing a surface-treated object having a surface treatment film. The surface to be surface-treated in the object to be surface-treated is not limited to particular surfaces, and examples thereof include a metal, a plastic, a wood material, a cellulose-based material such as paper, and various fibrous materials. The surface treatment agent is supplied to such surface to be surface-treated in the object to be surface-treated. The surface to be surface-treated is subjected to a pretreatment if necessary. The pretreatment is performed in order to mainly remove impurities on the surface to be surface-treated in many cases. Typically, delipidating with a known delipidating agent such as sodium metasilicate, sodium orthosilicate, NaOH, carbon tetrachloride, trichloroethylene, or a surfactant and further washing with a washing agent such as sodium pyrophosphate or etching by hydrofluoric acid, hydrochloric acid, organic acid, shot blast, or the like, to remove impurities on the surface to be surface-treated. Such pretreatment is favorably applied to a metal-based object to be surface-treated such as iron and steel, cast iron, zinc-plated steel plate, an aluminium product.

The surface treatment agent is supplied to a surface to be surface-treated by immersing, spraying, roll coating, curtain flow coating, rotating brush coating, powder coating, or electrostatic coating to adhere to the surface. Thereafter, the surface treatment agent is dried to cure. Thus, a coat (surface treatment film) is formed. The coat may be cured by a heat treatment, for example, a heat treatment at 200° C., at the same time or after the drying, if necessary. In the case of an object to be surface-treated with low heat resistance such as a plastic, a wood material, a cellulose-based material such as paper, or a fiber material, a coat may be formed by drying the surface treatment agent at room temperature (about 15° C. to about 40° C.) for several hours to several days to cure.

The surface-treated object having such surface treatment coat has favorable appearance properties and corrosion resistance caused by the composite material 10 and/or the composite material 20 in the surface treatment agent and can also has corrosion resistance, heat resistance, and chemical resistance caused by the silicon-containing resin and/or the fluorine-containing resin. Another coat of a paint or the like may further be formed on the obtained surface treatment film.

The thickness of the surface treatment film formed by the surface treatment agent is not limited to particular thicknesses and may be 30 μm or more and 500 μm or less. The thickness is preferably 50 μm or more and 200 μm or less.

(Rust and Corrosion Preventive Agent and Method)
(Rust and Corrosion Preventive Agent)

The rust and corrosion preventive agent contains a composite material 10 and/or a composite material 20. The rust and corrosion preventive agent can contain a known material as a rust and corrosion preventive agent in addition to the composite material 10 and/or the composite material 20. The rust and corrosion preventive agent can exert a self-sacrificial rust and corrosion preventive function based on zinc in the composite material 10 and/or the composite material 20. The rust and corrosion preventive agent preferably contains the composite material 10 and the composite material 20.

The rust and corrosion preventive agent can be dispersed in an aqueous medium and thus can be used as an aqueous rust and corrosion preventive agent. For example, the aqueous rust and corrosion preventive agent can typically contain an adhesive (binder), a surfactant, an aqueous solvent, and a thickener in addition to an aqueous medium such as water. Although the aqueous medium is not limited to particular media, examples thereof include boiling-treated tap water in addition to distilled water and ion-exchange water. The rust and corrosion preventive agent can be prepared by mixing these materials by a known method. At the time of producing the rust and corrosion preventive agent, the viscosity is preferably adjusted at 35 seconds or more to 45 seconds or less in an Iwata ford cup (NK-2).

The rust and corrosion preventive agent may contain the composite material 10 or the composite material 20 and preferably contains both of them. This is because a superior coating can be formed by a binder function and rust and corrosion preventive properties of the composite material 20 in addition to the appearance and the rust and corrosion preventive properties of the composite material 10.

(Adhesive)

The adhesive used in the rust and corrosion preventive agent is not limited to particular adhesives, and can be, for example, a silane coupling agent. The silane coupling agent can be 2-(3,4-epoxycyclohexyl)silane, ethyltrimethoxy silane, 3-glycidoxypropyltrimethoxysilane, 3-glycidoxypropylmethyldiethoxysilane, or 3-glycidoxypropyltriethoxysilane. In light of the stability and the adhesion of the treatment liquid, 3-glycidoxypropyltrimethoxysilane is the most preferable. One or more kinds of adhesives may be used. The amount of the adhesive to be added is preferably about 2% to 25% by mass, more preferably about 3% to 16% by mass in the rust and corrosion preventive agent. As described above, as the adhesive, the tin powder or the composite material 20 may be used. When the surface treatment agent contains the tin powder or the composite material 20, the amount is preferably 1% by mass or more and 50% by mass or less, more preferably 2% by mass or more and 45% by mass or less in the surface treatment agent.

The adhesive may be adhesive dark-brownish green chrome(III) oxide ($Cr_2O_3$) generated by reducing chromic acid ($CrO_3$). Chrome(III) oxide exerts adhesion by heating. Thus, chromic acid ($CrO_3$) may be used as the adhesive of the rust and corrosion preventive agent by utilizing this process. The amount of chrome(III) oxide ($Cr_2O_3$) to be added is, as chromic acid ($CrO_3$), preferably about 1% to 8% by mass, more preferably about 2% to 6% by mass in the rust and corrosion preventive agent. By using chromic acid as the adhesive, the cost of the rust and corrosion preventive agent can be effectively reduced.

When the rust and corrosion preventive agent contains the composite material 20, the composite material 20 itself functions as a pigment or self-sacrificial rust and corrosion preventive agent and also functions as an adhesive (binder). That is, the rust and corrosion preventive agent has a film-forming ability and adhesiveness even when it does not additionally contain an adhesive. For example, when the rust and corrosion preventive agent contains 0.5% by mass or more of the composite material 20 in the rust and corrosion preventive agent containing the composite material 10, the composite material 20 can effectively function as a binder in the surface treatment agent. The amount of the composite material 20 to be contained is preferably 1% by mass or more and 10% by mass or less, more preferably 2% by mass or more in the surface treatment agent. The amount is preferably 8% by mass or less, more preferably 6% by mass or less.

(Surfactant)

The surfactant to be used in the rust and corrosion preventive agent is used as a dispersant for dispersing the composite material 10 in a medium. The surfactant for dispersing the composite material 10 in an aqueous medium is not limited to particular surfactants, and examples thereof include alkylether-type nonionic surfactants such as polyoxyethylenebutylether, polyoxyethyleneoctylether, polyoxyethylenelaurylether, polyoxyethyleneoleylether, and polyoxyethylenestearylether; alkylester-type nonionic surfactants such as polyoxyethylenelaurate, polyoxyethyleneoleate, and polyoxyethylenestearate; and ethyleneoxidepropyreneoxide block copolymer-type nonionic surfactants such as polypropyleneglycol, polyethyleneglycolether. As the surfactant, a surfactant containing no aromatic series that is contaminated with endocrine-disrupting chemical in a molecule is desired, and a nonionic surfactant with a H.L.B. (Hydophile-Lipophile Balance) of 7 or more and 18 or less is preferable as the surfactant in the present invention. The H.L.B. of the more preferable surfactant is in the range of about 11 to about 14. One or more kinds of surfactants may be used. The amount of the surfactant to be added is preferably about 0.05% to 8% by mass, more preferably 0.1% to 5% by mass in the rust and corrosion preventive agent.

(Aqueous Solvent)

It is preferred that an aqueous solvent is further added to the aqueous medium of the rust and corrosion preventive agent in order to cause a favorable dispersion of the composite material by the aqueous solvent together with a surfactant. The aqueous solvent is not limited to particular solvents when it is an organic solvent that is compatible with water, and examples thereof include 1-propanol, 2-propanol, primary butanol, secondary butanol, tertiary butanol, ethylene glycol, diethylene glycol, propylene glycol, dipropylene glycol, glycerin, methyl cellosolve, ethyl cellosolve, butyl cellosolve, methyl carbitol, ethyl carbitol, butyl carbitol, diacetone alcohol, and 1,5-pentanediol. The water-soluble organic solvent can be, for example, more preferably glycerin, ethylene glycol, diethylene glycol, propylene glycol, or dipropylene glycol. As the aqueous solvent, they may be used alone or in a combination of two or more of them. The amount of the aqueous solvent to be added is preferably about 3% by mass to about 50% by mass, more preferably about 10% by mass to about 45% by mass.

(Thickener)

It is preferred that the thickener is added to the rust and corrosion preventive agent in order to secure the thickness of a layer of supplying a rust and corrosion preventive agent in the surface to be surface-treated. As the thickener, any of known thickeners used as known rust and corrosion preventive agents may be used without particular limitation, and examples of the thickener include water-soluble thickeners such as methyl cellulose, carboxymethyl cellulose, hydroxymethyl cellulose, ethyl cellulose, carboxyethyl cellulose, hydroxyethyl cellulose, hydroxypropyl cellulose, polyvinyl alcohol, starch, carrageenan, and pectin. The thickener is more preferably carboxymethyl cellulose, hydroxymethyl cellulose, hydroxyethyl cellulose, or hydroxypropyl cellulose. As the thickener, they may be used alone or in a combination of two or more of them. The amount of the thickener to be added is preferably about 0.05% by mass to about 5% by mass, more preferably about 0.1% by mass to about 2% by mass.

As the thickener, higher aliphatic carboxylic acid may also be used. When the higher aliphatic carboxylic acid is used, the amount of the higher aliphatic carboxylic acid to be added to the rust and corrosion preventive agent is 0.5% by mass or more to 5% by mass or less, preferably 1% by mass or more to 3% by mass or less. For example, a film can be formed by performing a heat treatment at a treatment temperature of 200° C. or more to 250° C. or less. The treatment temperature is preferably 210° C. or more. The film can be cured by a treatment time of 5 minutes or more to 10 minutes or less.

It is not always necessary to contain a solvent in the rust and corrosion preventive agent. This is because a solvent is not always necessary when the rust and corrosion preventive agent is supplied to an object to be surface-treated by a method of powder coating.

(Rust and Corrosion Preventive Method)

The rust and corrosion preventive method includes a step of supplying the rust and corrosion preventive agent on the surface of an object to be rust and corrosion prevention-treated to form a coat. The rust and corrosion preventive method is also a method for producing a rust and corrosion prevention-treated body having a rust and corrosion preventive coat. The surface to be rust and corrosion prevention-treated of the object to be rust and corrosion prevention-treated is not limited to particular surfaces and is, for example, typically a metal. The rust and corrosion preventive agent is supplied to such surface to be rust and corrosion prevention-treated of the object to be rust and corrosion prevention-treated. The surface to be rust and corrosion prevention-treated is subjected to a pretreatment if necessary. The pretreatment is intended to mainly remove impurities on the surface to be rust and corrosion prevention-treated in many cases. Typically, surface to be rust and corrosion prevention-treated is polished with shot blast, sand blast, or the like using the rust and corrosion preventive agent and is washed with an organic solvent such as n-hexane, xylene, methylethylketone, or acetone and the dried. Such pretreatment is favorably applied to a metal-based object to be rust and corrosion prevention-treated such as steel, cast iron, galvanized steel plate, or an aluminium product.

Thereafter, the rust and corrosion preventive agent is supplied to the surface to be rust and corrosion prevention-treated by immersing, spraying, roll coating, curtain flow coating, rotating brush coating, powder coating, or electrostatic coating. After the supply, the rust and corrosion preventive agent layer is dried as appropriate. The drying is not limited to particular drying, and the layer is left at room temperature, and air is blown to dry, if necessary, for example. Then, a condition of preliminarily heat drying for at least 10 minutes at 150° C. to 160° C. or the like is employed. Thereafter, a heat treatment at a temperature of, for example, preferably 300° C. or more to 400° C. or less, more preferably 320° C. or more to 370° C. or less is performed. By his heat treatment, a self-sacrificial metal rust and corrosion preventive coat of the rust and corrosion preventive agent is formed on the surface to be rust and corrosion prevention-treated. This rust and corrosion preventive metal coat may be coated with an over-coating agent if necessary.

When chromic acid is used as an adhesive, chromic acid changes to chrome(III) oxide in the preliminary drying or the heat treatment and thus is rendered harmless, exerts adhesiveness, and functions as a binder, for example.

When the rust and corrosion preventive agent contains the tin metal powder and/or the composite material 20 as a binder, a coat may be formed by a heat treatment at the treatment temperature of 200° C. or more to 250° C. or less. The treatment temperature is preferably 210° C. or more. This is because the composite material 20 contains tin and is thus melted at low temperature. The treatment time may be 1 minute or more to 10 minutes or less.

The thickness of the rust and corrosion preventive coat is not limited to particular thicknesses and is 5 µm or more to 30 µm or less. The thickness is preferably 10 µm or more, and more preferably 20 µm or less.

As described above, the composite material 10 disclosed in the specification of the present application can be a beautiful silver gray composite material with high brightness that has not been present before. That is, a color with high brightness can be produced without adding any another aluminium paste. Moreover, the composite material 10 can be safely stored and handled by forming a composite with zinc. Furthermore, the composite material 10 exerts an ultraviolet absorbing effect and self-sacrificial rust and corrosion preventive effect based on zinc oxide derived from zinc.

As described above, the composite material 20 disclosed in the specification of the present application can be a beautiful yellowish silver gray composite material with high brightness that has not been present before. Moreover, the composite material 20 has a binder function based on the properties of tin. Furthermore, the composite material 20 exerts an ultraviolet absorbing effect and self-sacrificial rust and corrosion preventive effect based on zinc oxide derived from zinc.

Therefore, the composite materials 10 and 20 disclosed in the specification of the present application can be components of the surface treatment agent and the rust and corrosion preventive agent and can also be used as pigments as they are. Thus, the composite materials 10 and 20 are applied for various uses such as paint and printing ink for decorating, painting, and car painting.

When each of the composite materials 10 and 20 disclosed in the specification of the present application is produced as a pigment, each of the composite materials 10 and 20 may be produced by mixing known components of the pigment together with raw materials of each of the composite materials 10 and 20 at the time of producing each of the composite materials 10 and 20 or may be produced by adding and mixing a pigment in each of the produced composite materials 10 and 20. Accordingly, pigments (that may be used as an adhesive at the same time) in various colors such as red and blue may be obtained. Moreover, the surface treatment agent and the rust and corrosion preventive agent each containing the composite material 10 and/or the composite material 20 disclosed in the specification of the present application themselves may be used as water-based paints.

According to the composite materials 10 and 20 disclosed in the specification of the present application, the surface treatment agent and the rust and corrosion preventive agent, which do not contain any harmful component in a coat, do not contain any harmful component or any component that generates a harmful component even after waste disposal, are environmentally friendly, and save resources and energy, can be provided. Moreover, as the rust and corrosion preventive agent, it is a superior self-sacrificial rust and corrosion preventive agent compared with known techniques such as electrogalvanizing, hot dip galvanizing, and impact zinc galvanizing. Furthermore, as the rust and corrosion preventive agent, a colored self-sacrificial rust and corrosion preventive agent may be produced without using any pigment. That is, the composite materials 10 and 20 disclosed in the specification of the present application are also pigments having a rust and corrosion preventive effect.

The surface treatment method, the rust and corrosion preventive method, the surface treatment agent, and the rust and corrosion preventive agent disclosed in the specification of the present application may be favorably used specifically for a rust and corrosion preventive agent of a zinc steel plate, a colored steel plate, and iron-based fastener part that are characterized in being obtained by application on a steel plate to be treated. More specifically, they may be used for (1) rust and corrosion prevention of a material for prefab such as a colored steel plate, (2) rust and corrosion prevention of an iron-based structure used outside such as guardrails, poles for lighting and sign, (3) rust and corrosion prevention of a steel plate as a substitute for a zinc steel plate of a transportation equipment such as an automobile, and (4) rust and corrosion prevention of fastener part such as a bolt, a nut, and tapping.

The composite material 20 disclosed in the specification of the present application is also useful as a battery material.

Thus, coat holding bodies with various forms, each including a coat that contains the composite material disclosed in the specification of the present application is provided.

EXAMPLES

The composite materials, the surface treatment agent, and the rust and corrosion preventive agent, disclosed in the specification of the present application, were described below with reference to specific examples. In the following examples, parts mean parts by mass, and % means % by mass.

Example 1

(Production of Composite Materials)
Aluminium/zinc flakes (composite materials) 1 to 4 were produced by the following procedures.
(Composite Material 1)
800 g of zinc particles (average particle diameter: 4 μm) obtained by an evaporation method, 200 g of aluminium particles (average particle diameter: 7 μm) obtained by an atomizing method, 4 L of mineral spirit, and 35 g of lubricating agent were crushed, mixed, and formed into flakes for 6 hours using a bead mill (including a 10 L-capacity holding tank in the fore stage) with a cylinder capacity of 1.4 L and zirconia balls (diameter: 0.8 mm) at a flow rate of liquid of 10 L/min, a slit width of 0.2 mm, a peripheral speed of blades in the cylinder of 110 m/min, and a liquid temperature of 14° C. to 16° C., a particle size measurement using a particle size distribution measurement device produced by Shimadzu Corporation was performed, and the result showed that the average particle diameter was 10.7 μm, and thus, the operation of the mill was stopped, and the mixture was filtrated. Thus, a composite material containing silver gray aluminium/zinc composite particles with high brightness (aluminium content: 20%) was obtained.
(Composite Material 2)
870 g of zinc particles (average particle diameter 4 μm) obtained by an evaporation method, 130 g of aluminium particles (average particle diameter: 7 μm) obtained by an atomizing method, 4 L of mineral spirit, and 35 g of lubricating agent were crushed, mixed, and formed into flakes for 6 hours using a bead mill (including a 10 L-capacity holding tank in the fore stage) with a cylinder capacity of 1.4 L and zirconia balls (diameter: 0.5 mm) at a flow rate of liquid of 10 L/min, a slit width of 0.2 mm, a peripheral speed of blades in the cylinder of 110 m/min, and a liquid temperature of 14° C. to 16° C., a particle size measurement using a particle size distribution measurement device produced by Shimadzu Corporation was performed, and the result showed that the average particle diameter was 10.3 μm, and thus, the operation of the mill was stopped, and the mixture was filtrated. Thus, a composite material containing silver gray aluminium/zinc composite particles with high brightness (aluminium content: 13%) was obtained.
(Composite Material 3)
870 g of zinc particles (average particle diameter: 4 μm) obtained by an evaporation method, 130 g of aluminium particles (average particle diameter: 7 μm) obtained by an atomizing method, 4 L of mineral spirit, and 35 g of lubricating agent were crushed, mixed, and formed into flakes for 6 hours using a bead mill (including a 10 L-capacity holding tank in the fore stage) with a cylinder capacity of 1.4 L and zirconia balls (diameter: 0.5 mm) at a flow rate of liquid of 10 L/min, a slit width of 0.2 mm, a peripheral speed of blades in the cylinder of 110 m/min, and a liquid temperature of 14° C. to 16° C., a particle size measurement using a particle size distribution measurement device produced by Shimadzu Corporation was performed, and the result showed that the average particle diameter was 22.4 μm, and thus, the operation of the mill was stopped, and the mixture was filtrated. Thus, a composite material containing silver gray aluminium/zinc composite particles with high brightness (aluminium content: 13%) was obtained.
(Composite Material 4)
800 g of zinc particles (average particle diameter: 4 μm) obtained by an evaporation method, 200 g of aluminium particles (average particle diameter: 7 μm) obtained by an atomizing method, 4 L of mineral spirit, and 40 g of lubricating agent were crushed, mixed, and formed into flakes for 6 hours using a bead mill (including a 10 L-capacity holding tank in the fore stage) with a cylinder capacity of 1.4 L and zirconia balls (diameter: 0.8 mm) at a flow rate of liquid of 10 L/min, a slit width of 0.2 mm, a peripheral speed of blades in the cylinder of 110 m/min, and a liquid temperature of 14° C. to 16° C., a particle size measurement using a particle size distribution measurement device (laser diffraction-light scattering method) produced by Shimadzu Corporation was performed, and the result showed that the average particle diameter was 10.5 μm, and thus, the operation of the mill was stopped, and the mixture was transferred into a distillatory device, and a mineral spirit and the like were recovered. Thus, a composite material containing silver gray aluminium/zinc flakes with high brightness as composite particles (aluminium content: 20%) was obtained.

Example 2

(Production Example of Surface Treatment Agent)
Surface treatment agents A and B were prepared by mixing raw materials for surface treatment agent shown below using the composite materials 1 and 2 produced in Example 1. An epoxy-modified silicone resin was prepared by the following method. That is, 30 parts of epoxy resin that is a condensate of epichlorohydrin and bisphenol A and 25 parts of 70% polysiloxane xylol solution (viscosity: 0.2 to 0.5 poise/25° C.) were mixed, and then, 0.5 parts of p-toluenesulfonic acid and 75 parts of diacetone alcohol were added thereto, a resultant mixture was then introduced into a reactor including a stirrer, a condenser, and a thermometer and heated and stirred at a reflux temperature to cause a reaction for 3 hours. Thereafter, xylole was removed together with water generated by the reaction. Thus, an epoxy-modified resin was obtained.

As polytetrafluoroethylene resin (200 mesh or less), LUBRON L-5 produced by Daikin Industries, Ltd. was used, and as a sag inhibitor, DISPARLON 6900-20X produced by Kusumoto Chemicals, Ltd. was used.

| (Surface treatment agent A) | |
|---|---|
| Composite material1 | 18.0 parts |
| Epoxy-modified silicone resin | 45.0 parts |
| Polytetrafluoroethylene resin | 3.9 parts |
| Sag inhibitor | 1.0 parts |
| Diacetone alcohol | 32.1 parts |

(The viscosity of the surface treatment agent, using Iwata ford cup NK-2, was 40 seconds.)

| (Surface treatment agent B) | |
|---|---|
| Composite material 2 | 16.5 parts |
| Epoxy-modified silicone resin | 41.5 parts |
| Polytetrafluoroethylene resin | 3.5 parts |
| Sag inhibitor | 1.0 parts |
| Diacetone alcohol | 37.5 parts |

(The viscosity of the surface treatment agent, using Iwata ford cup NK-2, was 40 seconds.)

Example 3

In the present example, steel plates and screws were surface-treated with the surface treatment agents A and B prepared in Example 2, and the appearance, the adhesiveness, and the corrosion resistance (salt water) were evaluated.

1. Sample
(1) Steel plate: SPCC-SB (JIS G 3141, 150 mm×70 mm×0.8 mm) was used. This was washed with n-hexane, dried, then surface-polished by shot blast, thereafter washed with n-hexane and ether, and dried.
(2) Screw: a cross slot screw with a length of 75 mm, a diameter of 2 mm, a head part of 8 mm, a thread part of 50 mm was used. This was washed with n-hexane, dried, then surface-polished by shot blast, thereafter washed with n-hexane, and dried.

2. Application and Heat Treatment
(1) Steel plate: The surface treatment agent A or B was applied to each steel plate so as to have a film thickness of 25 to 30 μm after heat treatment, the steel plate was then air-dried for 1 to 2 minutes, heat-dried for 10 minutes in a dryer at 200° C., and cooled, the same surface treatment agent was further applied to the steel plate, and the steel plate was dried, to obtain a film thickens of about 50 μm. The coating thickness of the surface treatment agent A was 48 μm. The coating thickness of the surface treatment agent B was 50 μm.
(2) Screw: Each screw was immersed in the treatment liquid A or B, raised, thereafter dewatered by a normal rotation for 3 seconds and a reverse rotation for 3 seconds in a dewaterer (diameter of basket: 200 mm, depth: 200 mm, rotation speed: 330 times/min), air-dried for 1 to 2 minutes, and then heat-dried for 10 minutes at 200° C. The film thicknesses of the surface treatment agents A and B were 7 μm.

3. Evaluation Method and Results
(1) Appearance of Coating on Steel Plate
The appearance of each coating was observed by visual check. The results are as follows.
Surface treatment agent A: beautiful bright silver gray
Surface treatment agent B: beautiful bright slightly grayish silver gray (2) Adhesiveness of Coating
A grid-pattern cut was made on each steel plate so as to form 100 cells, tape was adhered to the cells, and the tape was removed to check the adhesiveness. The results are as follows.
Surface treatment agent A: No removal of coat by removing the tape in 100 out of 100 cells
Surface treatment agent B: No removal of coat by removing the tape in 100 out of 100 cells
The results demonstrate that the adhesiveness of each of coats of the surface treatment agents A and B are superior.

(3) Corrosion Resistance (Salt Water Spraying Test)
The steel plates and screws were subjected to a salt water spraying test according to JIS-Z-23717. The results of the steel plates are shown in Table 1, and the results of the screws are shown in Table 2. A cross cut was made on each steel plate. The screws were a set of 5 screws. The steel plates were the same steel plates as in the example of general electrogalvanizing, and 16 μm chromate-treated article was used as a comparative example. The screws were the same screws as in the example in which head parts were subjected to general electrogalvanizing, and 13 μm chromate-treated article was used as a comparative example.

TABLE 1

| | | Salt water spraying time (hour) | | | | |
|---|---|---|---|---|---|---|
| Sample (Steel plate) | | 120 | 240 | 480 | 970 | 1060 |
| Example | Surface treatment agent A | a | a | a | a | a |
| | Surface treatment agent B | a | a | a | a | a |
| Comparative example | Cromate-treated article | b | — | — | — | — | a: not changed
b: red rust occurs on the whole surface

TABLE 2

| | | Salt water spraying time (hour) | | | | |
|---|---|---|---|---|---|---|
| Sample (Screw) | | 120 | 240 | 480 | 970 | 1060 |
| Example | Surface treatment agent A | a | a | a | a | a |
| | Surface treatment agent B | a | a | a | a | a |
| Comparative example | Cromate-treated article | b | — | — | — | — | a: not changed
b: red rust occurs on five of the five screw

As shown in Tables 1 and 2, it is obvious that the samples surface-treated with the surface treatment agents A and B have high corrosion resistance (rust and corrosion preventive properties).

Example 4

In the present example, a rust and corrosion preventive agent was prepared by mixing raw materials for rust and corrosion preventive agent shown below using the composite material 3 (aluminium flake-adhered zinc flakes with an aluminium content of 13% and an average particle diameter of 22.4 μm) produced in Example 1. The whole mixture was sieved with a 100 mesh sieve to prepare the rust and corrosion preventive agent. As polyoxyethylene octyl alcohol, polyoxyethylene octyl alcohol with HLB of 12.7 was used, and as a silane coupling agent, 3-glycidoxypropyltrimethoxysilane was used.

| (Rust and corrosion preventive agent) | |
| --- | --- |
| Composite material 3 | 25.0 parts |
| Polyoxyethylene octyl alcohol ether | 0.3 parts |
| Dipropylene glycol | 11.7 parts |
| Silane coupling agent | 13.0 parts |
| Distilled water | 47.0 parts |
| Boric acid | 3.0 parts |
| Hydroxyethyl cellulose | 0.2 parts |

(The viscosity of the rust and corrosion preventive agent after filtration, using Iwata ford cup NK-2 was 35 seconds.)

Example 5

In the present example, steel plates and screws were surface-treated with the rust and corrosion preventive agent prepared in Example 4, and the appearance, the adhesiveness, and the corrosion resistance (salt water) were evaluated.

1. Sample
(1) Steel plate: SS-41 steel plate (150 mm×70 mm×2.3 mm) was used. This was washed with n-hexane, dried, then surface-polished by shot blast, thereafter washed with n-hexane and ether, and dried.
(2) Screw: a cross slot screw with a length of 75 mm, a diameter of 2 mm, a head part of 8 mm, a thread part of 50 mm was used. This was washed with n-hexane, dried, then surface-polished by shot blast, thereafter washed with n-hexane, and dried.

2. Application and Heat Treatment
(1) Steel plate: The rust and corrosion preventive agent was applied to each steel plate so as to have a film thickness of 6 to 8 μm after heat treatment, the steel plate was then air-dried for 1 minute, and transferred into a dryer at 150° C., preliminarily heat-dried for 10 minutes, and thereafter heat-treated for 15 minutes at 340° C. to 350° C. (this was coating one time and baking one time). The same step was further performed to perform coating a total of two times and baking a total of two times. Thus, the total coating thickness was 16 μm.
(2) Screw: Each screw was immersed in the rust and corrosion preventive agent, raised, thereafter dewatered by a normal rotation for 3 seconds and a reverse rotation for 3 seconds in a dewaterer (diameter of basket: 200 mm, depth: 200 mm, rotation speed: 330 times/min), air-dried for 1 minute, and then preliminarily heat-dried for 10 minutes at 150° C., and then heat-treated for 15 minutes at 340° C. to 350° C. (This was coating one time and baking one time). The same step was further performed to perform coating a total of two times and baking a total of two times. Thus, the total coating thickness of was 15 μm.

3. Evaluation Method and Results
(1) Appearance of Coating on Steel Plate
The appearance of each film was observed by visual check. The results are as follows.
Steel plate: beautiful bright smooth slightly grayish silver-gray coating
(2) Adhesiveness of Coating
Steel plate: A grid-pattern cut was made on each steel plate so as to form 100 cells, tape was adhered to the cells, and the tape was removed to check the adhesiveness.
Screw: The head part of each screw was rubbed vigorously three times by a fingertip, and whether or not an adhesive was present was checked.
The results are as follows.
Steel plate: No removal of coat by removing the tape in 100 out of 100 cells
Screw: No adhesive on the fingertip The results demonstrate that the adhesiveness of each of coats of the rust and corrosion preventive agent on the steel plates and the screws is superior.

(3) Corrosion Resistance (Salt Water Spraying Test)
The steel plates and screws were subjected to a salt water spraying test according to JIS-Z-23717. The results of the steel plates are shown in Table 3, and the results of the screws are shown in Table 4. A cross cut was made on each steel plate. The screws were a set of 5 screws. The steel plates were the same steel plates as in the example of general electrogalvanizing, and 13 μm chromate-treated article was used as a comparative example. The screws were the same screws as in the example in which head parts were subjected to general electrogalvanizing, and 12 μm chromate-treated article was used as a comparative example. The results are shown in Tables 3 and 4.

TABLE 3

| | | Salt water spraying time (hour) | | | | |
| --- | --- | --- | --- | --- | --- | --- |
| Sample (Steel plate) | | 120 | 240 | 480 | 970 | 1060 |
| Example | Rust and corrosion preventive agent | a | a | a | a | a |
| Comparative example | Cromate-treated article | a | a | b* | b** | — | a: not changed
b*: rust does not occur on the cross cut, but red resut occurs on two places of the surface
b**: rust does not occur on the cross cut, but red resut occurs on two half of the surface

TABLE 4

| | | Salt water spraying time (hour) | | | | |
| --- | --- | --- | --- | --- | --- | --- |
| Sample (Screw) | | 120 | 240 | 480 | 970 | 1060 |
| Example | Rust and corrosion preventive agent | a | a | a | a | a |
| Comparative example | Cromate-treated article | a | b* | b** | — | — | a: not changed
b*: rust occurs on one of the five screw
b**: rust occurs on four of the five screw As shown in Tables 3 and 4, it is obvious that the steel plates and the screws treated with the rust and corrosion preventive agent have high corrosion resistance (rust and corrosion preventive properties).

Example 6

In the present example, a rust and corrosion preventive agent was prepared by mixing raw materials for rust and corrosion preventive agent shown below using the composite material 4 (aluminium flake-adhered zinc flakes with an aluminium content of 20% and an average particle diameter of 10.5 μm) produced in Example 1. The whole mixture was sieved with a 100 mesh sieve to prepare the rust and corrosion preventive agent. As polyoxyethylene octyl alcohol, polyoxyethylene octyl alcohol with HLB of 12.7 was used.

| (Rust and corrosion preventive agent) | |
| --- | --- |
| Composite material 4 | 13.0 parts |
| Polyoxyethylene octyl alcohol ether | 1.0 parts |

-continued

| (Rust and corrosion preventive agent) | |
|---|---|
| Glycerin | 2.0 parts |
| Diethylene glycol | 25.0 parts |
| Chromic acid | 4.8 parts |
| Distilled water | 54.2 parts |
| Hydroxyethyl cellulose | 0.38 parts |

(The viscosity of the rust and corrosion preventive agent after filtration, using Iwata ford cup NK-2 was 40 seconds.)

Example 7

In the present example, steel plates were surface-treated with the rust and corrosion preventive agent prepared in Example 6, and the appearance, the adhesiveness, and the corrosion resistance (salt water) were evaluated.

1. Sample

Steel plate: Steel plate SPCC-SB (JIS G 3141, 150 mm×70 mm×0.8 mm) was used. This was washed with n-hexane, dried, then surface-polished by shot blast, thereafter washed with n-hexane and ether, and dried.

2. Application and Heat Treatment

The rust and corrosion preventive agent was applied to each steel plate so as to have a Elm thickness of 6 to 8 μm after heat treatment, the steel plate was then air-dried for 1 to 2 minutes, and transferred into a dryer at 150° C. to 160° C., preliminarily heat-dried for 10 minutes, and thereafter heat-treated for 15 minutes at 340° C. to 350° C. (this was coating one time and baking one time). The same step was further performed to perform coating a total of two times and baking a total of two times. Thus, the total coating thickness was 15 μm.

3. Evaluation Method and Results (1) Appearance of Coating on Steel Plate

The appearance of each coating was observed by visual check. The results are as follows.

Steel plate: beautiful bright slightly smooth grayish silver-gray (2) Adhesiveness of Coating Steel plate: A grid-pattern cut was made on each steel plate so as to form 100 cells, tape was adhered to the cells, and the tape was removed to check the adhesiveness.

Screw: The head part of each screw was rubbed vigorously three times by a fingertip, and whether or not an adhesive was present was checked.

The results are as follows.

Steel plate: No removal of coat by removing the tape in 100 out of 100 cells

Screw: No adhesive on the fingertip

The results demonstrate that the adhesiveness of each of coats of the rust and corrosion preventive agent on the steel plates is superior.

(3) Corrosion Resistance (Salt Water Spraying Test)

The steel plates were subjected to a salt water spraying test according to JIS-2-23717. The results of the steel plates are shown in Table 5. A cross cut was made on each steel plate. The steel plates were the same steel plates as in the example of general electrogalvanizing, and 12 μm chromate-treated article was used as a comparative example. The results are shown in Table 5.

TABLE 5

| | | Salt water spraying time (hour) | | | | |
|---|---|---|---|---|---|---|
| Sample (Steel plate) | | 120 | 240 | 480 | 970 | 1060 |
| Example | Rust and corrosion preventive agent | a | a | a | a | a |
| Comparative example | Cromate-treated article | b* | b** | — | — | — | a: not changed
b*: red rust occurs on the five parts of the surface
b**: red rust occurs on about half of the surface As shown in Table 5, it is obvious that the steel plates treated with the rust and corrosion preventive agent have high corrosion resistance (rust and corrosion preventive properties).

Example 8

850 g of zinc particles (average particle diameter, about 3.7±0.3 μm) obtained by an evaporation method, 150 g of aluminium particles (average particle diameter 7 μm) obtained by an atomizing method, 2 L of mineral spirit, and 30 g of lubricating agent were crushed, mixed, and formed into flakes for 6 hours using a bead mill with a cylinder capacity of 1.4 L and zirconia balls (diameter 0.8 mm) at a flow rate of liquid of 10 L/min, a slit width of 0.2 mm, a peripheral speed of blades in the cylinder of 110 m/min, and a liquid temperature of 14° C. to 16° C., a particle size measurement using a particle size distribution measurement device produced by Shimadzu Corporation was performed, and the result showed that the average particle diameter was 10.3 μm, and thus, the operation of the bead mill was stopped. The whole amount of the mixture was transferred into an evaporation dryer and evaporatively dried. Thus, a beautiful bright silver gray metal (aluminium/zinc) flakes (metal flakes A) were obtained.

700 g of zinc particles (average particle diameter: 3.7±0.3 μm) obtained by an evaporation method, 300 g of tin particles (average particle diameter about 35 μm) obtained by an atomizing method, 2 L of mineral spirit, and 50 g of lubricating agent were crushed, mixed, and formed into flakes for 7 hours using a bead mill with a cylinder capacity of 1.4 L and zirconia balls (diameter 0.8 mm) at a flow rate of liquid of 10 L/min, a slit width of 0.2 mm, a peripheral speed of blades in the cylinder of 110 m/min, a liquid temperature of 14° C. to 15° C., a particle size measurement using a particle size distribution measurement device produced by Shimadzu Corporation was performed, and the result showed that the average particle diameter was 8.3 μm, and thus, the operation of the bead mill was stopped. The whole amount of the mixture was transferred into an evaporation dryer and evaporatively dried. Thus, yellowish silver gray metal (tin/zinc) flakes were obtained. The melting point of this metal (tin/zinc) flakes (metal flakes B) was 199° C.

The metal flakes A and B obtained in the present example were mixed as described below, and a surfactant and water-soluble organic solvent were further mixed therein to form slurry.

| Metal flakes A | 34.0 parts by weight |
|---|---|
| Metal flakes B | 26.0 parts by weight |
| Stearic acid | 0.6 parts by weight |
| Dispersant | 0.85 parts by weight |

-continued

| Dipropylene glycol | 28.55 parts by weight |
|---|---|
| Distilled water | 10.0 parts by weight |

(Dispersant was polyoxyethylene octyl alcohol ether, and the H.L.B. thereof was 12.7.)

Steel plates were surface-treated with this slurry, and the appearance, the adhesiveness, and the corrosion resistance (salt water) were evaluated.

1. Sample
Steel plate: Steel plate SPCC-SB (JIS G 3141, 150 mm×70 mm×0.8 mm) was used. This was washed with n-hexane, dried, then surface-polished by shot blast, thereafter washed with n-hexane and ether, and dried.

2. Application and Heat Treatment

The slurry was applied to each steel plate so as to have a film thickness of about 30 μm, and the steel plate was then air-dried for 1 to 2 minutes at room temperature and thereafter heat-treated for 10 minutes at 250° C. The coating thickness was 28 μm. This was used as sample A (coating one time and baking one time). The slurry was further applied to the steel plate so as to have a film thickness of about 30 μm after heat treatment, and the steel plate was left at room temperature and thereafter heat-treated for 10 minutes at 250° C. The total coating thickness was about 55 μm. This was used as sample B (coating two times and baking two times).

3. Evaluation Method and Results (1) Appearance of Coating on Steel Plate

The appearance of each coating was observed by visual check. The samples A and B were beautiful bright smooth silver gray coating.

(2) Adhesiveness of Coating

A grid-pattern cut was made on each steel plate so as to form 100 cells, tape was adhered to the cells, and the tape was removed to check the adhesiveness. No removal of coat by removing the tape in 100 out of 100 cells of each of the samples A and B.

The results demonstrate that the adhesiveness of each of coats of the slurry on the steel plates is superior. That is, the results demonstrates that tin/zinc flakes in the slurry function as a binder and functions as a superior binder at low temperature of 250° C. or less even when it does not contain binder materials.

(3) Corrosion Resistance (Salt Water Spraying Test)

The steel plates were subjected to a salt water spraying test according to JIS-2-23717. The results of the steel plates are shown in Table 6. A cross cut was made on each of the samples A and B. As a comparative example, a steel plate with a thickness of 2 mm, a width of 10 cm, and a length of 30 cm, plated in an electrogalvanized bath with an aluminium content of 15%, was used (thickness: 560 μm). The results are shown in Table 6.

TABLE 6

| Sample (Steel plate) | | Salt water spraying time (hour) | | | | |
|---|---|---|---|---|---|---|
| | | 120 | 240 | 480 | 970 | 1060 |
| Example | A | a | a | a | a | a |
| | B | a | a | a | a | a |
| Comparative example | Electrogalvanized article | a | a | a | a | a | a: not changed

As shown in Table 6, the steel plates (samples A and B) treated with the slurry exerted a practical rust and corrosion preventive ability. Moreover, it was demonstrated that sufficiently superior rust and corrosion preventive ability was exerted even in a film thinner than an electrogalvanized film.

Example 9

(Production of Composite Material (1))

800 g of zinc particles (average particle diameter: 3.7±0.3 μm) obtained by an evaporation method, 150 g of tin powder (β tin with a purity: 99.7% or more, an average particle diameter 35 μm) obtained by an atomizing method, 80 g of aluminium paste (65% aluminium paste, and thus, the content of aluminium flakes was 52 g), 3 L of mineral spirit, and 20 g of lubricating agent were crushed, mixed, and formed into flakes for 10 hours using a bead mill with a cylinder capacity of 1.4 L and zirconia balls (diameter: 0.8 mm) at a flow rate of liquid of L/min, a slit width of 0.2 mm, a peripheral speed of blades in the cylinder of 110 m/min, and a liquid temperature of 14° C. to 16° C., a particle size measurement using a particle size distribution measurement device produced by Shimadzu Corporation was performed, and the result showed that the average particle diameter was 8.3μ, then the whole amount of the mixture was transferred into a dryer (an evaporator or a dryer of evaporating and recovering a solvent while stirring a treatment liquid, and the recovery of the solvent was performed under reduced pressure at the liquid temperature of the treatment liquid of 150° C. or less to obtain a powder of the composite material) to recover the solvent under reduced pressure at the liquid temperature of the treatment liquid of 150° C. or less. Thus, a powder of the composite material was obtained. The powder was a yellowish silver gray powder, and the melting point thereof was 199° C.

(Production of Composite Material (2))

850 g of zinc particles (average particle diameter: 3.7±0.3 μm) obtained by an evaporation method, 150 g of aluminium particles (average particle diameter: 7 μm) obtained by an atomizing method, 3 L of mineral spirit, and 20 g of lubricating agent were crushed, mixed, and formed into flakes for 5 hours using a bead mill with a cylinder capacity of 1.4 L and zirconia balls (diameter 0.8 mm) at a flow rate of liquid of 10 L/min, a slit width of 0.2 mm, a peripheral speed of blades in the cylinder of 110 m/min, a liquid temperature of 14° C. to 16° C., a particle size measurement using a particle size distribution measurement device produced by Shimadzu Corporation was performed, the result showed that the average particle diameter was 19.0μ, the whole amount of the treatment liquid was then transferred into a dryer, and thus, bright zinc-based silver gray colored composite material (2) of aluminium flake-adhered zinc flakes was obtained under reduced pressure.

(Production of Composite Material (3))

800 g of zinc particles (average particle diameter: 3.7±0.3μ) obtained by an evaporation method, 60 g of aluminium particles (average particle diameter: 7μ) obtained by an atomizing method, 140 g of ultramarine blue (average particle diameter: 0.3μ), 4 L of mineral spirit, and 20 g of lubricating agent were crushed, mixed, and formed into flakes for 5 hours using a bead mill with a cylinder capacity of 1.4 L and zirconia balls (diameter: 0.8 mm) at a flow rate of liquid of 10 L/min, a slit width of 0.2 mm, a peripheral speed of blades in the cylinder of 110 m/min, a liquid temperature of 15° C. to 17° C., a particle size measurement using a particle size distribution measurement device produced by Shimadzu Corporation was performed, the result showed that the average particle diameter was 17.6μ, the whole amount of the treatment liquid was then transferred into a dryer, a solvent was recovered under reduced pressure, and thus, a powder of zinc-based blue colored composite material was obtained.

(Production of Composite Material (4))

800 g of zinc particles (average particle diameter: 3.7±0.3μ) obtained by evaporation method, 60 g aluminium particles (average particle diameter: 7μ) obtained by an atomizing method, 140 g of Bengala (average particle diameter 0.2μ), 4 L of mineral spirit, and 20 g of lubricating agent were crushed, mixed, and formed into flakes for 5 hours using a bead mill with a cylinder capacity of 1.4 L and zirconia balls (diameter: 0.8 mm) at a flow rate of liquid of 10 11 min, a slit width of 0.2 mm, a peripheral speed of blades in the cylinder of 110 m/min, a liquid temperature of 16° C. to 17° C., a particle size measurement using a particle size distribution measurement device produced by Shimadzu Corporation was performed, the result showed that the average particle diameter was 18.3μ, the whole amount of the treatment liquid was then transferred into a dryer, a solvent was recovered under reduced pressure, and thus, a powder of zinc-based red colored composite material was obtained.

The production of surface treatment agents using the composite materials (1) to (4) are described below.

| (Silver gray treatment agent) | |
|---|---|
| Composite material (1) | 15.0 parts |
| Composite material (2) | 30.0 parts |
| Propylene glycol | 34.2 parts |
| Polyoxyethylene octyl alcohol ether | 0.4 parts |
| Distilled water | 19.6 parts |
| Stearic acid | 0.8 parts |

The above-described materials were sufficiently mixed and stirred for 24 hours or more and were thereafter filtrated with a 100 mesh sieve, and then further mixed and stirred. The resultant mixture was used. The mixture was always stirred slowly in order not to precipitate the composite materials. The viscosity of this resultant treatment agent (treatment agent A) in Iwata ford cup (NK-2) was 33 seconds.

| (Blue treatment agent) | |
|---|---|
| Composite material (1) | 13.5 parts |
| Composite material (3) | 30.0 parts |
| Propylene glycol | 37.3 parts |
| Polyoxyethylene octyl alcohol ether | 0.4 parts |
| Distilled water | 18.0 parts |
| Stearic acid | 0.8 parts |

The above-described materials were sufficiently stirred and mixed for 24 hours or more and were thereafter filtrated with a 100 mesh sieve, and then further mixed and stirred. The resultant mixture was used. The mixture was always stirred slowly in order not to precipitate the composite materials. The viscosity of the resultant treatment agent (treatment agent B) of Example 2 in Iwata ford cup (NK-2) was 31 seconds.

| (Red treatment agent) | |
|---|---|
| Composite material (1) | 13.0 parts |
| Composite material (4) | 30.0 parts |
| Propylene glycol | 40.8 parts |

| (Red treatment agent) | |
|---|---|
| Polyoxyethylene octyl alcohol ether | 0.4 parts |
| Distilled water | 15.0 parts |
| Stearic acid | 0.8 parts |

The above-described materials were sufficiently stirred and mixed for 24 hours or more and were thereafter filtrated with a 100 mesh sieve, and then further mixed and stirred. The resultant mixture was used. The mixture was always stirred slowly in order not to precipitate the composite materials. The viscosity of this resultant treatment agent (treatment agent C) of Example 3 in Iwata ford cup (NK-2) was 32 seconds.

| (Silver gray treatment agent paste (gel)) | |
|---|---|
| Composite material (1) | 15.0 parts |
| Composite material (2) | 30.0 parts |
| Propylene glycol | 48.8 parts |
| polyoxy octyl alcohol ether | 0.4 parts |
| Distilled water | 5.0 parts |
| Stearic acid | 0.8 parts |

The above-described materials were sufficiently stirred and mixed for 5 hours or more, and then, it was confirmed that the mixture was formed into a paste (gel) without any air bubble. Thus, a treatment agent D was obtained (the treatment liquid was a paste, and thus, the metal flakes are less prone to be precipitated.)

In the present example, steel plates were surface-treated with the treatment agents A to D that are the surface treatment agents, and the appearance, the adhesiveness, and the corrosion resistance (salt water spraying test) were evaluated.

(Sample)

Steel plate: SPCC-SB (JIS G 3141, 150 mm×70 mm×0.8 mm) was used. This was washed with n-hexane, dried, then surface-polished by shot blast, thereafter washed with n-hexane and ether, and dried.

(Application and Heat Treatment)

The treatment liquid A, B, C, or D was applied to the surface of each steel plate so as to have a film thickness of 6 to 8 μm after heat treatment, the steel plate was then dried for 10 minutes at 140° C. to 150° C. as a preliminary drying, and then subjected to main drying for 5 minutes at 250° C. The steel plate was cooled and heat-dried, and thereafter, the treatment liquid A, B, C, or D was applied to the steel plate so as to have a total film thickness of 13 to 15μ, and the steel plate was then heat-dried.

(Evaluation Method and Results)

(1) Appearance of Coating on Steel Plate

The appearance of each coating was observed by visual check. The results are as follows.

Treatment agent A: Beautiful bright silver gray

Treatment agent B: Blue coating

Treatment agent C: Beautiful red coating

Treatment agent D: Beautiful silver gray (2) Adhesiveness of Coating

A grid-pattern cut was made on each steel plate so as to form 100 cells, tape was adhered to the cells, and the tape was removed to check the adhesiveness. The results are as follows.

Treatment agent A: No removal of coat by removing the tape in 100 out of 100 cells
Treatment agent B: No removal of coat by removing the tape in 100 out of 100 cells
Treatment agent C: No removal of coat by removing the tape in 100 out of 100 cells.
Treatment agent D: No removal of coat by removing the tape in 100 out of 100 cells.

(3) Corrosion Resistance (Salt Water Spraying Test)

Test pieces treated with the treatment liquid A to C were subjected to a salt water spraying test according to JIS-Z-23717. As a comparison, (electrogalvanized) chromate-treated article with a film thickness: 16μ was subjected to the test at the same time.

The test results of the coats treated with the treatment liquids A, B, C were superior compared with the electrogalvanized chromate-treated article.

| Sample (steel plate) | Salt water spraying test (hour) | | | |
|---|---|---|---|---|
|  | 120 | 240 | 970 | 1050 |
| Treatment agent A (coating thickness: 14 μm) | a | a | a | a |
| Treatment agent B (coating thickness: 12 μm) | a | a | a | a |
| Treatment agent C (coating thickness: 14 μm) | a | a | a | a |
| Treatment agent D (coating thickness: 15 μm) | a | a | a | a |
| Chromate-treated article (Comparison) | b | — | — | — |

(a: No change, b: Red rust was entirely generated)

The invention claimed is:

1. A composition comprising:
    tin/zinc composite particles, each of the tin/zinc composite particles comprising a tin particle and zinc particles adhered to a surface of the tin particle: and
    aluminum/zinc composite particles, each of the aluminum/zinc composite particles comprising an aluminum particle and zinc particles adhered to a surface of the aluminum particle, wherein in the tin/zinc composite particles: an average particle diameter of the tin particles is larger than an average particle diameter of the zinc particles, the average particle diameter of the zinc particles is equal to or greater than 2 μm and equal to or less than 10 μm, and the average particle diameter of the tin particles is equal to or greater than 8 μm and equal to or less than 40 μm; wherein each of the tin/zinc composite particles consists of a tin particle and zinc particles adhered to a surface of the tin particle.

2. The composition according to claim 1, wherein the tin/zinc composite particles have an average particle diameter of about 8 μm or more to about 40 μm.

3. A method for producing the composition according to claim 1, comprising:
    wet-mixing a zinc-based powder and a tin powder with a mill using balls or beads to form the tin/zinc composite particles;
    wet-mixing a zinc-based powder and an aluminum powder with a mill using balls or beads to form the aluminum/zinc composite particles; and
    mixing the tin/zinc composite particles and the aluminum/zinc composite particles.

4. The method according to claim 3, wherein
    the zinc-based powder is a powder obtained by an evaporation method, and
    the tin powder is a powder obtained by an evaporation method or an atomizing method.

5. A metal surface treatment agent comprising the composition according to claim 1.

6. A rust and corrosion preventive agent comprising the composition according to claim 1.

7. A pigment comprising the composition according to claim 1.

8. A paint comprising the composition according to claim 1.

9. A method for treating a surface of a body, the method comprising:
    supplying the composition according to claim 1 onto the surface of the body to form a coating.

10. A coated body comprising:
    a coating that contains the composition according to claim 1.

11. The composition according to claim 1, wherein the average particle diameter of the zinc particles in the tin/zinc composite particles is equal to or less than 5 μm.

12. The composition according to claim 1, wherein the average particle diameter of the tin particles is equal to or greater than 10 μm and equal to or less than 30 μm.

13. The composition according to claim 1, wherein the tin/zinc composite particles have an average particle diameter of 10 μm or more and 30 μm or less.

14. The method according to claim 3, wherein an average particle diameter of the tin powder is larger than an average particle diameter of the zinc-based powder.

15. The composition according to claim 1, wherein the composition is produced by:
    wet-mixing a zinc-based powder and a tin powder with a mill using balls or beads to form the tin/zinc composite particles;
    wet-mixing a zinc-based powder and an aluminum powder with a mill using balls or beads to form the aluminum/zinc composite particles; and
    mixing the tin/zinc composite particles and the aluminum/zinc composite particles.

* * * * *